Sept. 28, 1937.   H. W. PARKER   2,094,242
COATING AND METHOD OF APPLYING THE SAME
Filed Jan. 11, 1936
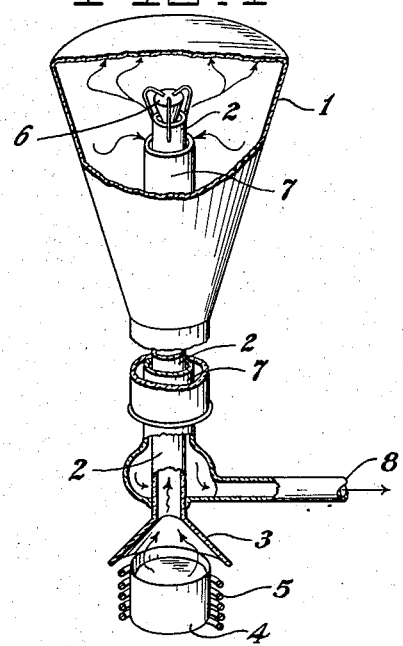
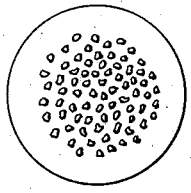
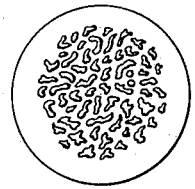
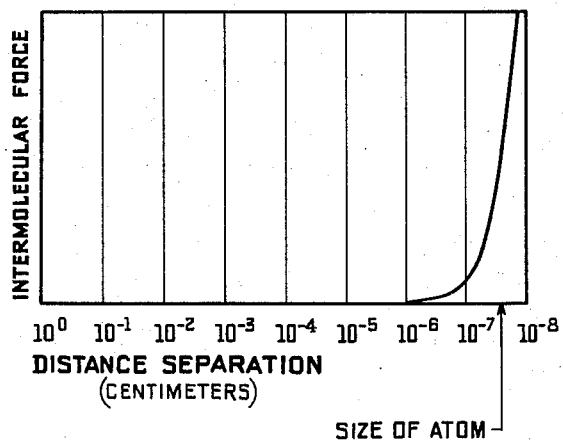
INVENTOR.
Henry W. Parker
BY
ATTORNEY.

Patented Sept. 28, 1937

2,094,242

UNITED STATES PATENT OFFICE 2,094,242

COATING AND METHOD OF APPLYING THE SAME

Henry W. Parker, Toronto, Ontario, Canada, assignor to Rogers Radio Tubes, Limited, Toronto, Ontario, Canada, a corporation of Ontario, Canada Application January 11, 1936, Serial No. 58,678

2 Claims. (Cl. 91—70)

My invention pertains to surface coatings and relates in particular to luminescent or fluorescent coatings and methods of applying same.

The principles involved in my improved method may be used to produce novel, efficient and effective coatings for many uses which will be readily apparent, but are especially adapted to the production of a novel coating which may be rendered efficiently and effectively fluorescent or luminous on excitation by electrons for use in cathode ray tubes for oscillographs and for television purposes and the like.

Luminescent or fluorescent coatings for uses as above noted have hitherto been made by one of the following methods:

First, the fluorescent material is caused to adhere to the surface of the object being coated by a binder such as sodium silicate;

Second, the luminescent material is precipitated in powder form out of absolute alcohol on the surface; and Third, the powdered luminescent material is burnt into a surface, such as glass, by bringing the temperature of the glass up near the melting point thereof.

The first of these methods has been found objectionable because the binder which is not fluorescent prevents electrons from penetrating the binder material sufficiently to effectively excite the fluorescent material. The second method is unsatisfactory because the luminescent material is contaminated with carbon compounds which cause diminution of the fluorescence due to the presence of impurities in the carbon compounds. The third method is unsatisfactory because imbedding the luminescent material in the glass causes contamination of the luminescent material and causes multiple reflection in the surface of the glass wall, producing a halo which destroys the definition of the image when such surfaces are used in television.

I have discovered that if the surface to be coated is first cleaned and then coated by a material which may be sublimated to produce on the surface a condensation mosaic or matrix, finely powdered solid material will be held to the surface by electrical attraction of the material of which the mosaic is made, evenly distributed and in a layer of uniform thickness, and that the material forming the mosaic may thereafter be completely evaporated to bring the particles of solid material sufficiently close in contact with the surface to permit their being held there solely by intermolecular forces, thus producing a coating involving no contamination or adulteration of the coating material and one extremely efficient and effective.

One of the principal objects of my invention comprises the provision of a process for producing on surfaces a highly efficient and effective coating of luminescent material.

Another object consists in the provision of a process for producing an unadulterated and uncontaminated coating which may be rendered efficiently and effectively fluorescent by electron excitation.

A further object comprises the provision of a process for coating a surface with a material which is held to the surface effectively solely by inter-molecular forces.

A still further object comprises producing a coating for surfaces of a finely divided material held evenly distributed over and to such surfaces solely by inter-molecular forces.

I accomplish all of the above noted desirable objects and features and others which will hereinafter be apparent by the process hereinafter described with respect to the drawing accompanying and forming a part of this specification and in which:

Fig. 1 is a partially sectioned, partially broken elevation of a form of apparatus which may be used in carrying out my method of coating a surface such as, for example, a cathode ray tube blank;

Figs. 2, 3 and 4 show several greatly magnified views of the condensation mosaic or matrix disposed on the surface by sublimation of a material such as carbon disulphide; and Fig. 5 is a curve showing the relation of interatomic forces with distance between the coating and surface.

In order to fully disclose my novel process and product, it is deemed advisable to describe the process as used to produce an improved article of manufacture such as a luminescent coating for a cathode ray blank. It is understood, of course, that such description is merely for the purpose of explanation, as my novel process may be utilized for the production of other coated products for many other uses.

Referring now to the drawing, and especially Fig. 1, the inside of the vitreous blank 1 of a cathode ray tube is thoroughly washed to remove all traces of grease and other impurities and the blank is then slipped on and held in any suitable manner over the stack device which may be made of metal or preferably glass, and which includes the tube 2 provided with a flare 3, under which is disposed a container 4 holding a quantity of material such as carbon disulphide and surrounded by a heating coil 5. The tube 2 is provided at its upper extremity with a disperser plug 6 held in position as shown. The tube 2 is further surrounded by an additional tube 7 welded at its lower extremity to the tube 2 and provided with an outlet 8 which is attached to an aspirator (not shown).

In carrying out my process, the carbon disulphide is heated by an electrical current which traverses the coil 5 and ignited and the fumes, because of the aspirator attached to the outlet 8, are caused to rise in tube 2 where the disperser plug 6 causes them to disperse evenly over the inner enlarged portion of the blank 1. The products of combustion which are essentially sulphur dioxide, sulphur trioxide, some sulphur, carbon dioxide and carbon monoxide, come into contact with the inner surface of the blank 1 and the sulphur condenses to form a condensation mosaic or matrix on the inner surface of the blank 1. The aspirator is used to suck out the excess gases and cause a draught which allows the sulphur to reach the desired part of the inside of the blank 1. The glass surface becomes milky-yellow in appearance due to the sublimation of the sulphur and the mosaic may be of varying degrees of thicknesses as shown in Figs. 2, 3 and 4 when viewed under a microscope, where Fig. 2 is a microscopic view of a thin coating of sulphur, Fig. 3 is a microscopic view of a medium thick coating, and Fig. 4 is a magnified view of a relatively thick coating of sulphur condensation mosaic. The mosaic is formed of minute droplets and these form on preferred centers of the surface of the glass or metal being coated. The reason for the condensation on preferred centers is perhaps due to electrical forces existing between crystal inter-faces of the surface being coated. The reasons of preferred center condensation is a surface phenomena which at present is not fully understood.

After the sulphur condensation mosaic has been formed, powdered luminescent material such as, synthetic willemite (crystalline zinc orthosilicate with a small portion of manganese), zinc sulphide with copper or other impurities removed, or other phosphor, as materials which become fluorescent when excited by electrons are now termed, is scattered evenly over the surface. The powder is prepared for even distribution or scattering over the surface by complete drying and screening after being reduced to powdered form. It is then stirred or agitated in order that it may be well mixed with air to give it the desired fluff. When the powder is properly screened, dried and fluffed, it is free-flowing like a liquid due to the mixture of air with the finely divided material. The powder is slid down the inside of the blank and by a rapid twist of the blank the powder is evenly thrown and distributed over the sulphur mosaic where it is held by the electrical charge on the surface of the sulphur mosaic. The sulphur mosaic will, I have found, hold a uniformly thick, evenly distributed layer of the powder as most of the excess powder slides off, or the excess powder may be removed by the use of any suitable wiper. Further, the excess sulphur mosaic may be removed, before the powdered material is distributed thereon, by the use of any suitable wiper to give a sharply defined edge to the area which it is desired to coat with luminescent material. After the excess luminescent material has been wiped off, the entire blank is subjected to heat to evaporate the sulphur. In this heating operation the entire blank is heated for about twenty minutes and the sulphur is completely evaporated, leaving the blank free of sulphur. The heating of the blank serves to dispose of all of the sulphur and allows the evenly disposed luminescent material to come into such intimate contact with the glass surface of the blank that the material is held to the surface solely by inter-molecular forces. As shown in Fig. 5, the inter-molecular forces at distances of $10^{-6}$ cm. are negligibly small, but when two particles come within $10^{-7}$ cm. of each other they are attracted to each other by inter-molecular forces. The curve shows that this force increases extremely rapidly when particles come within a distance of less than $10^{-7}$ cm. of each other or, in other words, approach a distance comparable to the size of an atom.

In my experiments, I have proved that the luminescent material is held to the surface solely by inter-molecular forces because such material coated by the above described process has been analyzed and found to contain no sulphur or other binding medium.

My method permits achieving an extremely uniform coating of luminescent material of optimum thickness closely adhering to the surface of the object being coated without being imbedded and without any contaminating or adulterating carbon compounds or other binding material. The result attained in the case of a luminescent screen to be rendered fluorescent by excitation of electrons is extremely effective and efficient.

It will be obvious from the foregoing that my invention provides a novel process for providing improved coatings for surfaces whereby the coating is held to the surface solely by inter-molecular forces to eliminate the necessity of adulterating or contaminating binders and which, in the case of luminescent coatings for cathode ray tubes, provides an unadulterated coating which is of optimum thickness and uniform distribution and therefore highly efficient and effective for the purpose intended.

Although I have shown and disclosed by way of example only one embodiment of my invention, it will be apparent that various changes may be made therein without departing from the intended scope and spirit of the invention. I do not therefore desire to limit myself to the foregoing except as may be pointed out in the appended claims in which I claim:

1. The method of providing a surface coating adapted to be rendered fluorescent by electron bombardment which comprises, cleaning such surface, exposing the surface to the products of the incomplete combustion of carbon disulphide to form a matrix of ionized sulphur on said surface, scattering finely powdered material adapted to be rendered fluorescent on electron bombardment on said sulphur matrix to evenly coat said matrix with said material, removing the excess of said fluorescent material and thereafter applying heat to said surface to evaporate all of the slphur of said matrix to permit said fluorescent material to adhere to said surface solely by inter-molecular forces.

2. The method of providing a surface coating which comprises, cleaning such surface, exposing the surface to the products of the incomplete combustion of carbon disulphide to form a condensation mosaic of sulphur on said surface, scattering finely divided phosphorescent material on said mosaic to evenly coat said mosaic with said material, removing the excess of finely divided material and thereafter applying heat to said surface to evaporate all of the sulphur forming said mosaic to permit said finely divided material to adhere to said surface solely by inter-molecular forces.

HENRY W. PARKER.